(12) United States Patent
Gu et al.

(10) Patent No.: US 11,367,019 B1
(45) Date of Patent: Jun. 21, 2022

(54) DATA PROCESSING METHOD AND APPARATUS, AND COMPUTER DEVICE

(71) Applicant: Shanghai IceKredit, Inc., Shanghai (CN)

(72) Inventors: Lingyun Gu, Shanghai (CN); Minqi Xie, Shanghai (CN); Wan Duan, Shanghai (CN); Yizeng Huang, Shanghai (CN); Tao Zhang, Shanghai (CN); Kai Zhang, Shanghai (CN)

(73) Assignee: Shanghai IceKredit, Inc., Shanghai (CN)

( * ) Notice: Subject to any disclaimer, the term of this patent is extended or adjusted under 35 U.S.C. 154(b) by 0 days.

(21) Appl. No.: 17/403,924

(22) Filed: Aug. 17, 2021

(30) Foreign Application Priority Data

Nov. 30, 2020 (CN) .......................... 202011367879.5

(51) Int. Cl.
*G06N 20/00* (2019.01)
*G06Q 10/06* (2012.01)
(Continued)

(52) U.S. Cl.
CPC ........... *G06N 20/00* (2019.01); *G06Q 10/067* (2013.01); *G06N 20/20* (2019.01); *G06Q 40/025* (2013.01)

(58) Field of Classification Search
CPC ..... G06N 20/00; G06Q 10/067; G06Q 40/025
See application file for complete search history.

(56) References Cited

U.S. PATENT DOCUMENTS 11,100,524 B1 * 8/2021 Ross ...................... G06Q 30/02
2005/0055257 A1 * 3/2005 Senturk .............. G06Q 30/0201
705/7.11
(Continued)

FOREIGN PATENT DOCUMENTS

CN      110135494 A      8/2019
CN      110222710 A  *  9/2019  ............. G06N 20/00
(Continued)

OTHER PUBLICATIONS

Torrent, "PSD2 Explainable AI Model for Credit Scoring", Nov. 20, 2020. (Year: 2020).*
(Continued)

*Primary Examiner* — Dave Misir
(74) *Attorney, Agent, or Firm* — Bayramoglu Law Offices LLC

(57) ABSTRACT

A data processing method includes: obtaining first sample data, and determining a target model and a feature set corresponding to the target model; obtaining second sample data, and dividing the second sample data into a development data set and a validation data set based on a predetermined proportion or a predetermined chronological order; respectively determining final sample data of the first sample data and retained sample data of the development data set based on the target model, the feature set corresponding to the target model, the first sample data, the development data set and the validation data set; and merging the final sample data and the retained sample data to obtain a modeling data set corresponding to a first business project. A data processing apparatus, and a computer device for implementing the data processing method are further provided.

20 Claims, 2 Drawing Sheets

(51) Int. Cl.
 *G06Q 40/02* (2012.01)
 *G06N 20/20* (2019.01)

(56) References Cited

U.S. PATENT DOCUMENTS

2012/0197608 A1* 8/2012 Pinto .................... G06Q 30/02
                                                703/2
2014/0046879 A1* 2/2014 Maclennan .......... G06Q 10/067
                                                706/12
2018/0075354 A1* 3/2018 Averboch ................ G06F 17/18
2020/0401948 A1* 12/2020 Ma .......................... G06N 5/02

FOREIGN PATENT DOCUMENTS

| CN | 110738527 A | 1/2020 |
| CN | 111435463 A | 7/2020 |
| CN | 111563821 A | 8/2020 |

OTHER PUBLICATIONS

Provenzano, "Machine Learning approach for Credit Scoring", Jul. 2020. (Year: 2020).*

* cited by examiner

DATA PROCESSING METHOD AND APPARATUS, AND COMPUTER DEVICE

CROSS REFERENCE TO THE RELATED APPLICATIONS

This application is based upon and claims priority to Chinese Patent Application No. 202011367879.5, filed on Nov. 30, 2020, the entire contents of which are incorporated herein by reference.

TECHNICAL FIELD

The present invention relates to the technical field of data processing, and more particularly, to a data processing method and apparatus, and a computer device.

BACKGROUND

In most existing cold-start modeling methods for credit and loan products, risk modeling is performed by using original stock sample data of other credit and loan products or a small amount of new sample data accumulated at an initial stage of a new product. In a new scheme, modeling is performed by adjusting weights of old and new samples and then fusing the old and new samples according to a transfer learning method.

Since the new and old samples belong to different products and customer groups, the samples are distributed differently. Modeling excessively depending on the original data of other products results in a high bias of a prediction result, and modeling excessively depending on a small amount of data of the new product results in a high variance of the model. Modeling by fusing old and new data through transfer learning also results in a poor generalization capability of a model due to the excessively large variance of the single model.

SUMMARY

To resolve the above problems, the present invention provides a data processing method and apparatus, and a computer device.

According to a first aspect of the embodiments of the present invention, a data processing method is provided, where the method is applied to a computer device, and includes:

obtaining first sample data corresponding to a first business project from a preset database, training N candidate models based on the first sample data, selecting M target models from the N candidate models based on a maximal mutual-information coefficient, and determining M feature sets corresponding to the M target models, where N and M are positive integers, and N is greater than M;

obtaining second sample data corresponding to a second business project from the preset database, and dividing the second sample data into a development data set and a validation data set based on a predetermined proportion or a predetermined chronological order;

training the M target models based on the development data set and a data feature corresponding to the development data set to determine hit probabilities of target sample data of the development data set, the validation data set and the first sample data, and determining a hit label of the target sample data of the first sample data based on the hit probabilities and a preset probability threshold;

calculating area under curve (AUC) scores of the M target models based on the hit probability of the target sample data of the validation data set output by the M target models, and actual sample labels;

selecting, based on the hit label of the first sample data, identical target sample data output by the M target models to be initially selected sample data; and determining weighted average probabilities of the initially selected sample data based on the hit probability of the first sample data of the M target models and the AUC scores of the M target models, where weighted values are the AUC scores of the M target models;

sorting the weighted average probabilities to obtain a sorted queue, and extracting sample data from two ends of the sorted queue to be final sample data based on a predetermined proportion;

determining retained sample data of the development data set based on the hit probability of the development data set and the AUC scores of the M target models; and merging the final sample data and the retained sample data to obtain a modeling data set corresponding to the first business project.

Optionally, the step of merging the final sample data and the retained sample data to obtain the modeling data set corresponding to the first business project includes:

after merging the final sample data and the retained sample data at a first time, iteratively performing steps of determining the final sample data and the retained sample data for a plurality of rounds, and merging final sample data and retained sample data obtained by iteratively performing the steps for the plurality of rounds to obtain the modeling data set.

Optionally, the step of determining the retained sample data of the development data set based on the hit probability of the development data set and the AUC scores of the M target models specifically includes:

determining weighted prediction probabilities of the development data set based on the hit probability of the development data set and the AUC scores of the M target models, and determining a classification prediction loss function in combination with real sample labels of the development data set; and predicting the development data set by using the classification prediction loss function, and selecting sample data with a prediction loss rate being less than a preset threshold in the development data set to be the retained sample data of the development data set.

Optionally, the step of determining the M feature sets corresponding to the M target models includes:

after obtaining a first feature distribution queue and a second feature distribution queue of each target model, obtaining first queue description information of the first feature distribution queue and second queue description information of the second feature distribution queue, where the first feature distribution queue includes a first feature distribution trajectory, and the second feature distribution queue includes a second feature distribution trajectory; and obtaining each group of information variables in the first queue description information and each group of information variables in the second queue description information to obtain an information variable matrix; determining a variable correlation coefficient between any two groups of information variables in the information variable matrix to obtain a first correlation coefficient list; adjusting a variable correlation coefficient being less than a target coefficient in the first correlation coefficient list to be the target coefficient to obtain a second correlation coefficient list; and determining a feature set corresponding to each target model based on the second correlation coefficient list and a coincidence degree between the first feature distribution trajectory and the second feature distribution trajectory.

Optionally, the step of merging the final sample data and the retained sample data each time specifically includes:

constructing a first data label distribution corresponding to the final sample data, and a second data label distribution corresponding to the retained sample data, where the first data label distribution and the second data label distribution include a plurality of sample fields with different label recognition degrees, respectively;

extracting field feature information of any sample field of the final sample data in the first data label distribution, and determining a sample field with a minimum label recognition degree in the second data label distribution as a target sample field;

mapping the field feature information to the target sample field based on a temporal correlation between the final sample data and the retained sample data to obtain field mapping information in the target sample field, and generating a sample label mapping path between the final sample data and the retained sample data based on the field feature information and the field mapping information; and obtaining to-be-merged information in the target sample field by taking the field mapping information as reference information; mapping, based on node parameters of a plurality of mapping path nodes corresponding to the sample label mapping path, the to-be-merged information to a sample field in which the field feature information is located to obtain a data merging list corresponding to the to-be-merged information in the sample field in which the field feature information is located; splitting the final sample data and the retained sample data based on the data merging list; and pairing and merging, one by one based on a data merging order in the data merging list, a first data set obtained by splitting the final sample data and a second data set obtained by splitting the retained sample data.

According to a second aspect of the embodiments of the present invention, a data processing apparatus is provided, where the apparatus is applied to a computer device, and includes:

a model training module, configured to obtain first sample data corresponding to a first business project from a preset database, train N candidate models based on the first sample data, select M target models from the N candidate models based on a maximal mutual-information coefficient, and determine M feature sets corresponding to the M target models, where N and M are positive integers, and N is greater than M;

a data division module, configured to obtain second sample data corresponding to a second business project from the preset database, and divide the second sample data into a development data set and a validation data set based on a predetermined proportion or a predetermined chronological order;

a label determining module, configured to train the M target models based on the development data set and a data feature corresponding to the development data set to determine hit probabilities of target sample data of the development data set, the validation data set and the first sample data, and determine a hit label of the target sample data of the first sample data based on the hit probabilities and a preset probability threshold;

a score calculation module, configured to calculate AUC scores of the M target models based on the hit probability of the target sample data of the validation data set output by the M target models, and actual sample labels;

a data selection module, configured to select, based on the hit label of the first sample data, identical target sample data output by the M target models to be initially selected sample data; and determine weighted average probabilities of the initially selected sample data based on the hit probability of the first sample data of the M target models and the AUC scores of the M target models, where weighted values are the AUC scores of the M target models;

a data extraction module, configured to sort the weighted average probabilities to obtain a sorted queue, and extract sample data from two ends of the sorted queue to be final sample data based on a predetermined proportion:

a data determining module, configured to determine retained sample data of the development data set based on the hit probability of the development data set and the AUC scores of the M target models; and a data merging module, configured to merge the final sample data and the retained sample data to obtain a modeling data set corresponding to the first business project.

Optionally, the model training module is configured to:

after obtaining a first feature distribution queue and a second feature distribution queue of each target model, obtain first queue description information of the first feature distribution queue and second queue description information of the second feature distribution queue, where the first feature distribution queue includes a first feature distribution trajectory, and the second feature distribution queue includes a second feature distribution trajectory; and obtain each group of information variables in the first queue description information and each group of information variables in the second queue description information to obtain an information variable matrix; determine a variable correlation coefficient between any two groups of information variables in the information variable matrix to obtain a first correlation coefficient list; adjust a variable correlation coefficient being less than a target coefficient in the first correlation coefficient list to be the target coefficient to obtain a second correlation coefficient list; and determine a feature set corresponding to each target model based on the second correlation coefficient list and a coincidence degree between the first feature distribution trajectory and the second feature distribution trajectory.

Optionally, the data merging module is configured to:

construct a first data label distribution corresponding to the final sample data, and a second data label distribution corresponding to the retained sample data, where the first data label distribution and the second data label distribution include a plurality of sample fields with different label recognition degrees, respectively;

extract field feature information of any sample field of the final sample data in the first data label distribution, and determine a sample field with a minimum label recognition degree in the second data label distribution as a target sample field;

map the field feature information to the target sample field based on a temporal correlation between the final sample data and the retained sample data to obtain field mapping information in the target sample field, and generate a sample label mapping path between the final sample data and the retained sample data based on the field feature information and the field mapping information; and obtain to-be-merged information in the target sample field by taking the field mapping information as reference information; map, based on node parameters of a plurality of mapping path nodes corresponding to the sample label mapping path, the to-be-merged information to a sample field in which the field feature information is located to obtain a data merging list corresponding to the to-be-merged information in the sample field in which the field feature information is located; split the final sample data and the retained sample data based on the data merging list; and pair and merge, one by one based on a data merging order in the data merging list, a first data set obtained by splitting the final sample data and a second data set obtained by splitting the retained sample data.

According to a third aspect of the embodiments of the present invention, a computer device is provided, where the computer device implements the above method during running.

According to a fourth aspect of the embodiments of the present invention, a computer-readable storage medium is provided, where the computer-readable storage medium stores a computer program, and the computer program implements the above method during running.

The embodiments of the present invention provide a data processing method and apparatus, and a computer device, which obtain first sample data of a first business project, and determine a target model and a feature set corresponding to the target model; obtain second sample data of a second business project, and divide the second sample data into a development data set and a validation data set based on a predetermined proportion or a predetermined chronological order; determine final sample data of the first sample data and retained sample data of the development data set based on the target model, the feature set corresponding to the target model, the first sample data, the development data set, and the validation data set; and merge the determined final sample data and retained sample data to obtain a modeling data set corresponding to the first business project. In this way, a stable modeling sample in the first business project can be selected effectively by using a plurality of models, and samples in the second business project that have similar distributions with that in the first business project can be selected effectively, to increase a quantity of effective samples for modeling of the first business project. In addition, samples can be selected based on a prediction result of multi-model fusion, effectively reducing a bias and a variance of the model.

BRIEF DESCRIPTION OF THE DRAWINGS

To describe the technical solutions in the embodiments of the present invention more clearly, the following briefly describes the accompanying drawings required for describing the embodiments. It should be understood that, the following accompanying drawings show merely some embodiments of the present invention, and therefore should not be regarded as a limitation on the scope. A person of ordinary skill in the art may still derive other related drawings from these accompanying drawings without creative efforts.

DETAILED DESCRIPTION OF THE EMBODIMENTS

For the sake of a better understanding of the above technical solutions, the technical solutions in the present invention are described in detail with reference to the accompanying drawings and specific embodiments. It should be understood that the embodiments in the present invention and specific features in the embodiments are detailed descriptions of the technical solutions in the present invention, and are not intended to limit the technical solutions in the present invention. The embodiments in the present invention and technical features in the embodiments may be combined with each other in a non-conflicting situation.

Figure 1:
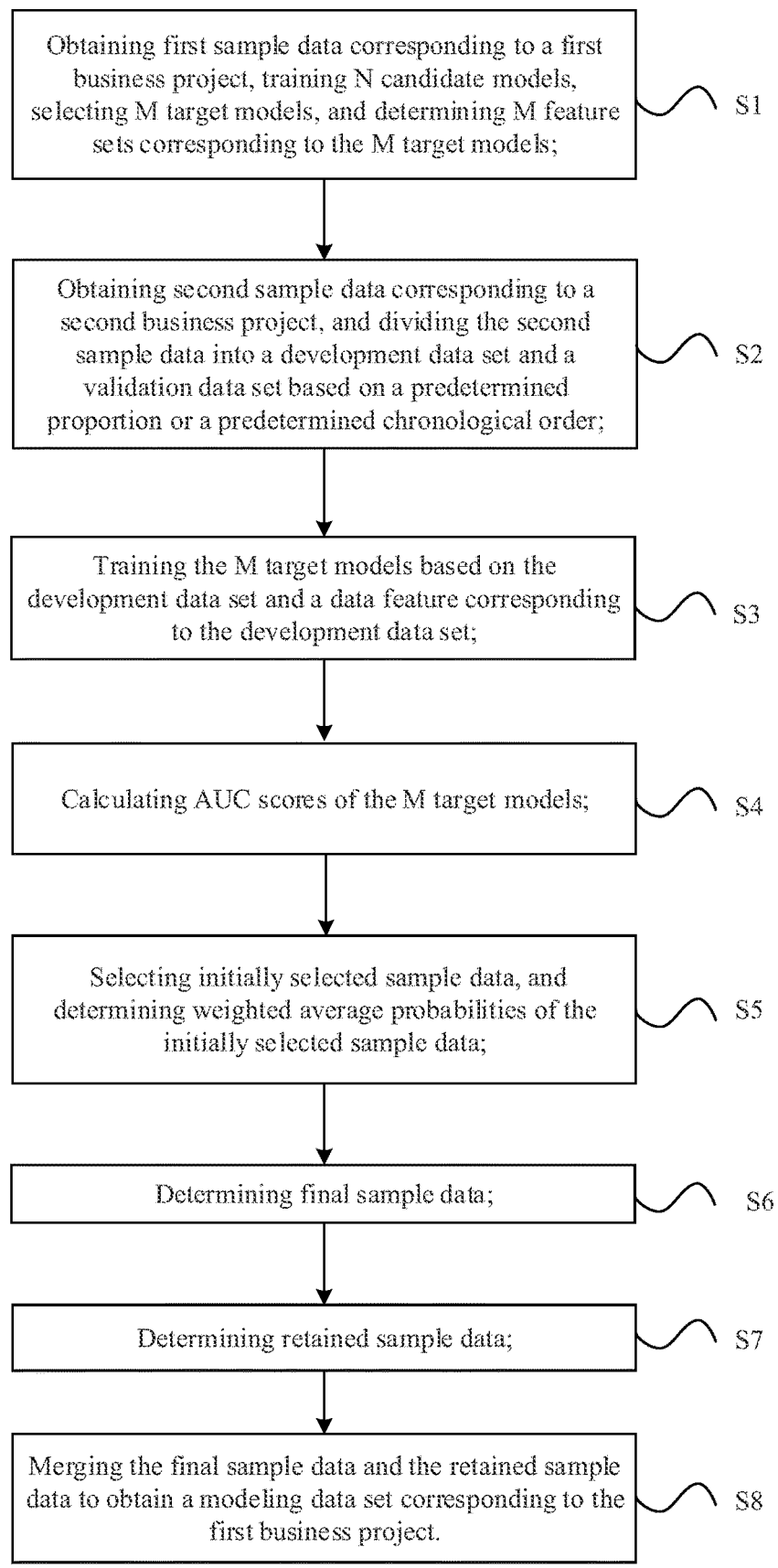
FIG. 1 is a flowchart of a data processing method according to an embodiment of the present invention.

To resolve the technical problems in the prior art, the embodiments of the present invention provide a data processing method and apparatus, and a computer device. FIG. 1 shows a data processing method. The method specifically includes the following steps S1 to S8.

Step S1: Obtain first sample data corresponding to a first business project from a preset database, train N candidate models based on the first sample data, select M target models from the N candidate models based on a maximal mutual-information coefficient, and determine M feature sets corresponding to the M target models.

N and M are positive integers, and N is greater than M.

Step S2: Obtain second sample data corresponding to a second business project from the preset database, and divide the second sample data into a development data set and a validation data set based on a predetermined proportion or a predetermined chronological order.

Step S3: Train the M target models based on the development data set and a data feature corresponding to the development data set to determine hit probabilities of target sample data of the development data set, the validation data set and the first sample data, and determine a hit label of the target sample data of the first sample data based on the hit probabilities and a preset probability threshold.

Step S4: Calculate AUC scores of the M target models based on the hit probability of the target sample data of the validation data set output by the M target models, and actual sample labels.

Step S5: Select, based on the hit label of the first sample data, identical target sample data output by the M target models to be initially selected sample data; and determine weighted average probabilities of the initially selected sample data based on the hit probability of the first sample data of the M target models and the AUC scores of the M target models, where weighted values are the AUC scores of the M target models.

Step S6: Sort the weighted average probabilities to obtain a sorted queue, and extract sample data from two ends of the sorted queue to be final sample data based on a predetermined proportion.

Step S7: Determine retained sample data of the development data set based on the hit probability of the development data set and the AUC scores of the M target models.

Step S8: Merge the final sample data and the retained sample data to obtain a modeling data set corresponding to the first business project.

It can be understood that the above steps S1 to S8 are performed to obtain the first sample data of the first business project, and determine the target model and the feature set corresponding to the target model; obtain the second sample data of the second business project, and divide the second sample data into the development data set and the validation data set based on the predetermined proportion or the predetermined chronological order; determine the final sample data of the first sample data and the retained sample data of the development data set based on the target model, the feature set corresponding to the target model, the first sample data, the development data set, and the validation data set; and merge the determined final sample data and retained sample data to obtain the modeling data set corresponding to the first business project. In this way, a stable modeling sample in the first business project can be selected effectively by using a plurality of models, and samples in the second business project that have similar distributions with that in the first business project can be selected effectively, to increase a quantity of effective samples for modeling of the first business project. In addition, samples can be selected based on a prediction result of multi-model fusion, effectively reducing a bias and a variance of the model.

In an implementation that can be realized, the step of merging the final sample data and the retained sample data to obtain the modeling data set corresponding to the first business project in step S8 specifically includes: after merging the final sample data and the retained sample data at a first time, iteratively performing steps of determining the final sample data and the retained sample data for a plurality of rounds, and merging final sample data and retained sample data obtained by iteratively performing the steps for the plurality of rounds to obtain the modeling data set. In this way, integrity and accuracy of the modeling data set can be ensured.

Further, the step of determining the retained sample data of the development data set based on the hit probability of the development data set and the AUC scores of the M target models in step S7 specifically includes: determining weighted prediction probabilities of the development data set based on the hit probability of the development data set and the AUC scores of the M target models, and determining a classification prediction loss function in combination with real sample labels of the development data set; and predicting the development data set by using the classification prediction loss function, and selecting sample data with a prediction loss rate being less than a preset threshold in the development data set to be the retained sample data of the development data set.

In an alternative implementation, to accurately determine the M feature sets, the step of determining the M feature sets corresponding to the M target models in step S1 may specifically include the following steps S11 and S12.

Step S11: After obtaining a first feature distribution queue and a second feature distribution queue of each target model, obtain first queue description information of the first feature distribution queue and second queue description information of the second feature distribution queue, where the first feature distribution queue includes a first feature distribution trajectory, and the second feature distribution queue includes a second feature distribution trajectory.

Step S12: Obtain each group of information variables in the first queue description information and each group of information variables in the second queue description information to obtain an information variable matrix; determine a variable correlation coefficient between any two groups of information variables in the information variable matrix to obtain a first correlation coefficient list; adjust a variable correlation coefficient being less than a target coefficient in the first correlation coefficient list to be the target coefficient to obtain a second correlation coefficient list; and determine a feature set corresponding to each target model based on the second correlation coefficient list and a coincidence degree between the first feature distribution trajectory and the second feature distribution trajectory.

It can be understood that the M feature sets can be accurately determined by performing the above steps S11 and S12.

In a possible embodiment, in the step of merging the final sample data and the retained sample data in step S8, the merging the final sample data and the retained sample data each time may specifically include the following steps S81 to S84.

Step S81: Construct a first data label distribution corresponding to the final sample data, and a second data label distribution corresponding to the retained sample data, where the first data label distribution and the second data label distribution include a plurality of sample fields with different label recognition degrees, respectively.

Step S82: Extract field feature information of any sample field of the final sample data in the first data label distribution, and determine a sample field with a minimum label recognition degree in the second data label distribution as a target sample field.

Step S83: Map the field feature information to the target sample field based on a temporal correlation between the final sample data and the retained sample data to obtain field mapping information in the target sample field, and generate a sample label mapping path between the final sample data and the retained sample data based on the field feature information and the field mapping information.

Step S84: Obtain to-be-merged information in the target sample field by taking the field mapping information as reference information; map, based on node parameters of a plurality of mapping path nodes corresponding to the sample label mapping path, the to-be-merged information to a sample field in which the field feature information is located to obtain a data merging list corresponding to the to-be-merged information in the sample field in which the field feature information is located; split the final sample data and the retained sample data based on the data merging list; and pair and merge, one by one based on a data merging order in the data merging list, a first data set obtained by splitting the final sample data and a second data set obtained by splitting the retained sample data.

It can be understood that the final sample data and the retained sample data can be accurately merged by performing the above steps S81 to S84, avoiding missing data during data merging.

Figure 2:
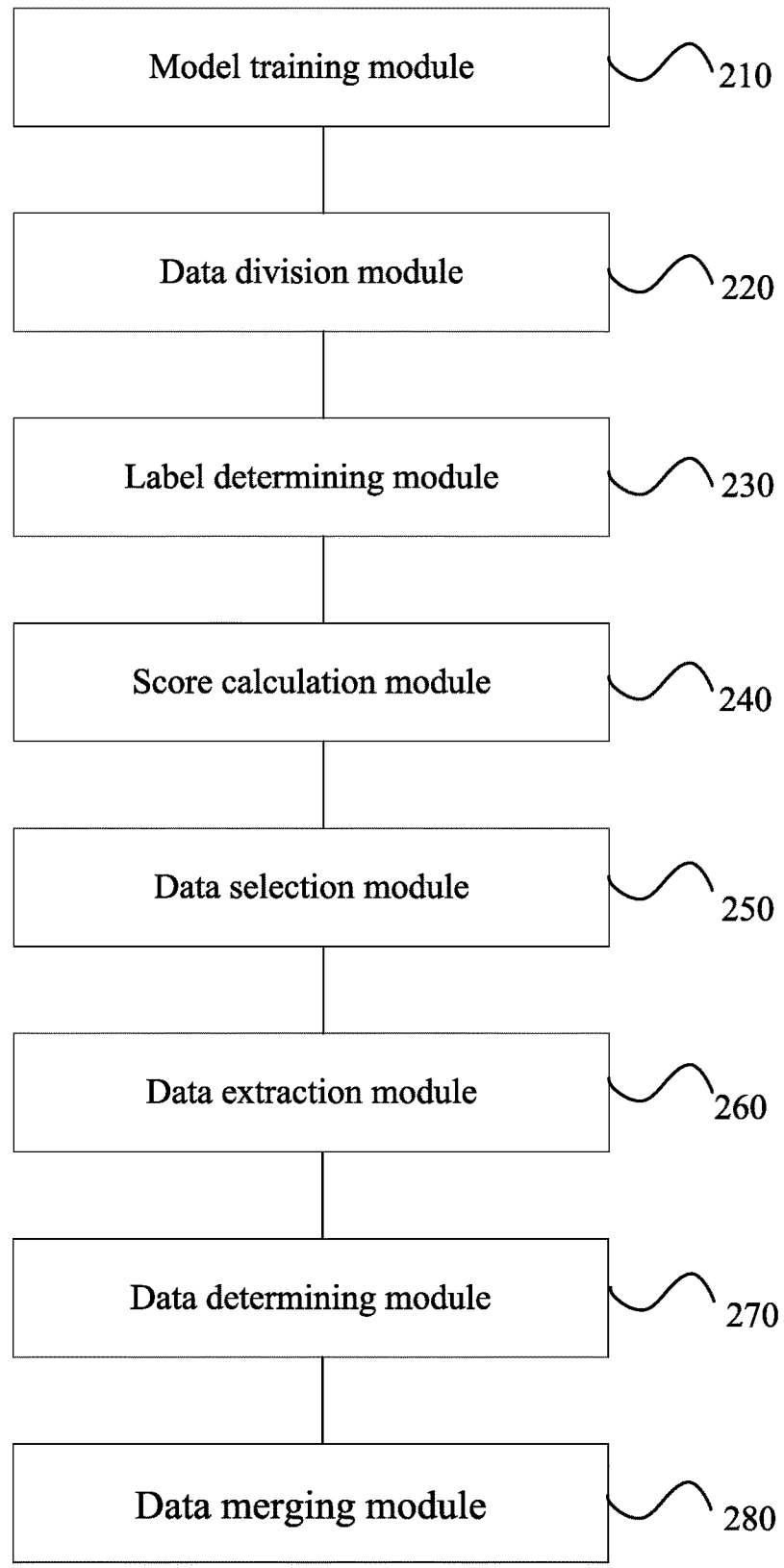
FIG. 2 is a block diagram of functional modules of a data processing apparatus according to an embodiment of the present invention.

Based on the above same inventive concept, a data processing apparatus 200 is provided, as shown in FIG. 2. The apparatus is applied to a computer device, and includes:

a model training module 210, configured to obtain first sample data corresponding to a first business project from a preset database, train N candidate models based on the first sample data, select M target models from the N candidate models based on a maximal mutual-information coefficient, and determine M feature sets corresponding to the M target models, where N and M are positive integers, and N is greater than M;

a data division module 220, configured to obtain second sample data corresponding to a second business project from the preset database, and divide the second sample data into a development data set and a validation data set based on a predetermined proportion or a predetermined chronological order;

a label determining module 230, configured to train the M target models based on the development data set and a data feature corresponding to the development data set to determine hit probabilities of target sample data of the development data set, the validation data set and the first sample data, and determine a hit label of the target sample data of the first sample data based on the hit probabilities and a preset probability threshold;

a score calculation module 240, configured to calculate AUC scores of the M target models based on the hit probability of the target sample data of the validation data set output by the M target models, and actual sample labels;

a data selection module 250, configured to select, based on the hit label of the first sample data, identical target sample data output by the M target models to be initially selected sample data; and determine weighted average probabilities of the initially selected sample data based on the hit probability of the first sample data of the M target models and the AUC scores of the M target models, where weighted values are the AUC scores of the M target models;

a data extraction module 260, configured to sort the weighted average probabilities to obtain a sorted queue, and extract sample data from two ends of the sorted queue to be final sample data based on a predetermined proportion;

a data determining module 270, configured to determine retained sample data of the development data set based on the hit probability of the development data set and the AUC scores of the M target models; and a data merging module 280, configured to merge the final sample data and the retained sample data to obtain a modeling data set corresponding to the first business project.

Optionally, the model training module 210 is configured to:

after obtaining a first feature distribution queue and a second feature distribution queue of each target model, obtain first queue description information of the first feature distribution queue and second queue description information of the second feature distribution queue, where the first feature distribution queue includes a first feature distribution trajectory, and the second feature distribution queue includes a second feature distribution trajectory; and obtain each group of information variables in the first queue description information and each group of information variables in the second queue description information to obtain an information variable matrix; determine a variable correlation coefficient between any two groups of information variables in the information variable matrix to obtain a first correlation coefficient list; adjust a variable correlation coefficient being less than a target coefficient in the first correlation coefficient list to be the target coefficient to obtain a second correlation coefficient list; and determine a feature set corresponding to each target model based on the second correlation coefficient list and a coincidence degree between the first feature distribution trajectory and the second feature distribution trajectory.

Optionally, the data merging module 280 is configured to:

construct a first data label distribution corresponding to the final sample data, and a second data label distribution corresponding to the retained sample data, where the first data label distribution and the second data label distribution include a plurality of sample fields with different label recognition degrees, respectively;

extract field feature information of any sample field of the final sample data in the first data label distribution, and determine a sample field with a minimum label recognition degree in the second data label distribution as a target sample field;

map the field feature information to the target sample field based on a temporal correlation between the final sample data and the retained sample data to obtain field mapping information in the target sample field, and generate a sample label mapping path between the final sample data and the retained sample data based on the field feature information and the field mapping information; and obtain to-be-merged information in the target sample field by taking the field mapping information as reference information; map, based on node parameters of a plurality of mapping path nodes corresponding to the sample label mapping path, the to-be-merged information to a sample field in which the field feature information is located to obtain a data merging list corresponding to the to-be-merged information in the sample field in which the field feature information is located; split the final sample data and the retained sample data based on the data merging list; and pair and merge, one by one based on a data merging order in the data merging list, a first data set obtained by splitting the final sample data and a second data set obtained by splitting the retained sample data.

Based on the above same or similar inventive concept, a computer device is further provided. The computer device implements the above method during running.

Based on the above same or similar inventive concept, a computer-readable storage medium is further provided. The computer-readable storage medium stores a computer program, and the computer program implements the above method during running.

To sum up, the embodiments of the present invention provide a data processing method and apparatus, and a computer device, which obtain first sample data of a first business project, and determine a target model and a feature set corresponding to the target model; obtain second sample data of a second business project, and divide the second sample data into a development data set and a validation data set based on a predetermined proportion or a predetermined chronological order; determine final sample data of the first sample data and retained sample data of the development data set based on the target model, the feature set corresponding to the target model, the first sample data, the development data set, and the validation data set; and merge the determined final sample data and retained sample data to obtain a modeling data set corresponding to the first business project. In this way, a stable modeling sample in the first business project can be selected effectively by using a plurality of models, and samples in the second business project that have similar distributions with that in the first business project can be selected effectively, to increase a quantity of effective samples for modeling of the first business project. In addition, samples can be selected based on a prediction result of multi-model fusion, effectively reducing a bias and a variance of the model.

Described above are merely embodiments of the present invention, and are not intended to limit the present invention. Various changes and modifications can be made to the present invention by those skilled in the art. Any modifications, equivalent replacements, improvements, etc. made within the spirit and principle of the present invention should be included within the protection scope of the claims of the present invention.

What is claimed is:

1. A data processing method, comprising:
obtaining first sample data corresponding to a first business project from a preset database, training N candidate models based on the first sample data, selecting M target models from the N candidate models based on a maximal mutual-information coefficient, and determining M feature sets corresponding to the M target models, wherein N and M are positive integers, and N is greater than M;
obtaining second sample data corresponding to a second business project from the preset database, and dividing the second sample data into a development data set and a validation data set based on a predetermined proportion or a predetermined chronological order;

training the M target models based on the development data set and a data feature corresponding to the development data set to determine a hit probability of target sample data of the development data set, a hit probability of target sample data of the validation data set and a hit probability of target sample data of the first sample data, and determining a hit label of the target sample data of the first sample data based on the hit probability of the target sample data of the development data set, the hit probability of the target sample data of the validation data set, the hit probability of the target sample data of the first sample data, and a preset probability threshold;

calculating area under curve (AUC) scores of the M target models based on the hit probability of the target sample data of the validation data set output by the M target models, and actual sample labels;

selecting, based on the hit label of the first sample data, identical target sample data output by the M target models to be initially selected sample data; and determining weighted average probabilities of the initially selected sample data based on the hit probability of the target sample data of the first sample data of the M target models and the AUC scores of the M target models;

sorting the weighted average probabilities to obtain a sorted queue, and extracting sample data from two ends of the sorted queue to be final sample data based on the predetermined proportion;

determining retained sample data of the development data set based on the hit probability of the target sample data of the development data set and the AUC scores of the M target models; and merging the final sample data and the retained sample data to obtain a modeling data set corresponding to the first business project.

2. The data processing method according to claim 1, the step of merging the final sample data and the retained sample data to obtain the modeling data set corresponding to the first business project comprises:

after merging the final sample data and the retained sample data at a first time, iteratively performing steps of determining the final sample data and the retained sample data for a plurality of rounds, and merging final sample data and retained sample data obtained by iteratively performing the steps for the plurality of rounds to obtain the modeling data set.

3. The data processing method according to claim 1, wherein the step of determining the retained sample data of the development data set based on the hit probability of the target sample data of the development data set and the AUC scores of the M target models specifically comprises:

determining weighted prediction probabilities of the development data set based on the hit probability of the target sample data of the development data set and the AUC scores of the M target models, and determining a classification prediction loss function in combination with real sample labels of the development data set; and predicting the development data set by using the classification prediction loss function, and selecting sample data with a prediction loss rate being less than a preset threshold in the development data set to be the retained sample data of the development data set.

4. The data processing method according to claim 1, wherein the step of determining the M feature sets corresponding to the M target models comprises:

after obtaining a first feature distribution queue and a second feature distribution queue of each target model, obtaining first queue description information of the first feature distribution queue and second queue description information of the second feature distribution queue, wherein the first feature distribution queue comprises a first feature distribution trajectory, and the second feature distribution queue comprises a second feature distribution trajectory; and obtaining information variables in the first queue description information and information variables in the second queue description information to obtain an information variable matrix; determining a variable correlation coefficient between any two groups of information variables in the information variable matrix to obtain a first correlation coefficient list; adjusting a variable correlation coefficient being less than a target coefficient in the first correlation coefficient list to be the target coefficient to obtain a second correlation coefficient list; and determining a feature set corresponding to each target model based on the second correlation coefficient list and a coincidence degree between the first feature distribution trajectory and the second feature distribution trajectory.

5. The data processing method according to claim 2, wherein the step of merging the final sample data and the retained sample data each time specifically comprises:

constructing a first data label distribution corresponding to the final sample data, and a second data label distribution corresponding to the retained sample data, wherein the first data label distribution and the second data label distribution comprise a plurality of sample fields with different label recognition degrees, respectively;

extracting field feature information of any sample field of the final sample data in the first data label distribution, and determining a sample field with a minimum label recognition degree in the second data label distribution as a target sample field;

mapping the field feature information to the target sample field based on a temporal correlation between the final sample data and the retained sample data to obtain field mapping information in the target sample field, and generating a sample label mapping path between the final sample data and the retained sample data based on the field feature information and the field mapping information; and obtaining to-be-merged information in the target sample field by taking the field mapping information as reference information; mapping, based on node parameters of a plurality of mapping path nodes corresponding to the sample label mapping path, the to-be-merged information to a sample field in which the field feature information is located to obtain a data merging list corresponding to the to-be-merged information in the sample field in which the field feature information is located; splitting the final sample data and the retained sample data based on the data merging list; and pairing and merging, one by one based on a data merging order in the data merging list, a first data set obtained by splitting the final sample data and a second data set obtained by splitting the retained sample data.

6. The data processing method according to claim 2, wherein the step of determining the M feature sets corresponding to the M target models comprises:
after obtaining a first feature distribution queue and a second feature distribution queue of each target model, obtaining first queue description information of the first feature distribution queue and second queue description information of the second feature distribution queue, wherein the first feature distribution queue comprises a first feature distribution trajectory, and the second feature distribution queue comprises a second feature distribution trajectory; and
obtaining information variables in the first queue description information and information variables in the second queue description information to obtain an information variable matrix; determining a variable correlation coefficient between any two groups of information variables in the information variable matrix to obtain a first correlation coefficient list; adjusting a variable correlation coefficient being less than a target coefficient in the first correlation coefficient list to be the target coefficient to obtain a second correlation coefficient list; and determining a feature set corresponding to each target model based on the second correlation coefficient list and a coincidence degree between the first feature distribution trajectory and the second feature distribution trajectory.

7. The data processing method according to claim 3, wherein the step of determining the M feature sets corresponding to the M target models comprises:
after obtaining a first feature distribution queue and a second feature distribution queue of each target model, obtaining first queue description information of the first feature distribution queue and second queue description information of the second feature distribution queue, wherein the first feature distribution queue comprises a first feature distribution trajectory, and the second feature distribution queue comprises a second feature distribution trajectory; and
obtaining information variables in the first queue description information and information variables in the second queue description information to obtain an information variable matrix; determining a variable correlation coefficient between any two groups of information variables in the information variable matrix to obtain a first correlation coefficient list; adjusting a variable correlation coefficient being less than a target coefficient in the first correlation coefficient list to be the target coefficient to obtain a second correlation coefficient list; and determining a feature set corresponding to each target model based on the second correlation coefficient list and a coincidence degree between the first feature distribution trajectory and the second feature distribution trajectory.

8. A computer device, wherein the computer device implements the data processing method according to claim 1.

9. The computer device according to claim 8, the step of merging the final sample data and the retained sample data to obtain the modeling data set corresponding to the first business project comprises:
after merging the final sample data and the retained sample data at a first time, iteratively performing steps of determining the final sample data and the retained sample data for a plurality of rounds, and merging final sample data and retained sample data obtained by iteratively performing the steps for the plurality of rounds to obtain the modeling data set.

10. The computer device according to claim 8, wherein the step of determining the retained sample data of the development data set based on the hit probability of the target sample data of the development data set and the AUC scores of the M target models specifically comprises:
determining weighted prediction probabilities of the development data set based on the hit probability of the target sample data of the development data set and the AUC scores of the M target models, and determining a classification prediction loss function in combination with real sample labels of the development data set; and
predicting the development data set by using the classification prediction loss function, and selecting sample data with a prediction loss rate being less than a preset threshold in the development data set to be the retained sample data of the development data set.

11. The computer device according to claim 8, wherein the step of determining the M feature sets corresponding to the M target models comprises:
after obtaining a first feature distribution queue and a second feature distribution queue of each target model, obtaining first queue description information of the first feature distribution queue and second queue description information of the second feature distribution queue, wherein the first feature distribution queue comprises a first feature distribution trajectory, and the second feature distribution queue comprises a second feature distribution trajectory; and
obtaining information variables in the first queue description information and information variables in the second queue description information to obtain an information variable matrix; determining a variable correlation coefficient between any two groups of information variables in the information variable matrix to obtain a first correlation coefficient list; adjusting a variable correlation coefficient being less than a target coefficient in the first correlation coefficient list to be the target coefficient to obtain a second correlation coefficient list; and determining a feature set corresponding to each target model based on the second correlation coefficient list and a coincidence degree between the first feature distribution trajectory and the second feature distribution trajectory.

12. The computer device according to claim 9, wherein the step of merging the final sample data and the retained sample data each time specifically comprises:
constructing a first data label distribution corresponding to the final sample data, and a second data label distribution corresponding to the retained sample data, wherein the first data label distribution and the second data label distribution comprise a plurality of sample fields with different label recognition degrees, respectively;
extracting field feature information of any sample field of the final sample data in the first data label distribution, and determining a sample field with a minimum label recognition degree in the second data label distribution as a target sample field;
mapping the field feature information to the target sample field based on a temporal correlation between the final sample data and the retained sample data to obtain field mapping information in the target sample field, and generating a sample label mapping path between the final sample data and the retained sample data based on the field feature information and the field mapping information; and obtaining to-be-merged information in the target sample field by taking the field mapping information as reference information; mapping, based on node parameters of a plurality of mapping path nodes corresponding to the sample label mapping path, the to-be-merged information to a sample field in which the field feature information is located to obtain a data merging list corresponding to the to-be-merged information in the sample field in which the field feature information is located; splitting the final sample data and the retained sample data based on the data merging list; and pairing and merging, one by one based on a data merging order in the data merging list, a first data set obtained by splitting the final sample data and a second data set obtained by splitting the retained sample data.

13. A non-transitory computer-readable storage medium, wherein a computer program is stored in the computer-readable storage medium, and the computer program implements the data processing method according to claim 1.

14. The non-transitory computer-readable storage medium according to claim 13, the step of merging the final sample data and the retained sample data to obtain the modeling data set corresponding to the first business project comprises:

after merging the final sample data and the retained sample data at a first time, iteratively performing steps of determining the final sample data and the retained sample data for a plurality of rounds, and merging final sample data and retained sample data obtained by iteratively performing the steps for the plurality of rounds to obtain the modeling data set.

15. The non-transitory computer-readable storage medium according to claim 13, wherein the step of determining the retained sample data of the development data set based on the hit probability of the target sample data of the development data set and the AUC scores of the M target models specifically comprises:

determining weighted prediction probabilities of the development data set based on the hit probability of the target sample data of the development data set and the AUC scores of the M target models, and determining a classification prediction loss function in combination with real sample labels of the development data set; and predicting the development data set by using the classification prediction loss function, and selecting sample data with a prediction loss rate being less than a preset threshold in the development data set to be the retained sample data of the development data set.

16. The non-transitory computer-readable storage medium according to claim 13, wherein the step of determining the M feature sets corresponding to the M target models comprises:

after obtaining a first feature distribution queue and a second feature distribution queue of each target model, obtaining first queue description information of the first feature distribution queue and second queue description information of the second feature distribution queue, wherein the first feature distribution queue comprises a first feature distribution trajectory, and the second feature distribution queue comprises a second feature distribution trajectory; and obtaining information variables in the first queue description information and information variables in the second queue description information to obtain an information variable matrix; determining a variable correlation coefficient between any two groups of information variables in the information variable matrix to obtain a first correlation coefficient list; adjusting a variable correlation coefficient being less than a target coefficient in the first correlation coefficient list to be the target coefficient to obtain a second correlation coefficient list; and determining a feature set corresponding to each target model based on the second correlation coefficient list and a coincidence degree between the first feature distribution trajectory and the second feature distribution trajectory.

17. The non-transitory computer-readable storage medium according to claim 14, wherein the step of merging the final sample data and the retained sample data each time specifically comprises:

constructing a first data label distribution corresponding to the final sample data, and a second data label distribution corresponding to the retained sample data, wherein the first data label distribution and the second data label distribution comprise a plurality of sample fields with different label recognition degrees, respectively;

extracting field feature information of any sample field of the final sample data in the first data label distribution, and determining a sample field with a minimum label recognition degree in the second data label distribution as a target sample field;

mapping the field feature information to the target sample field based on a temporal correlation between the final sample data and the retained sample data to obtain field mapping information in the target sample field, and generating a sample label mapping path between the final sample data and the retained sample data based on the field feature information and the field mapping information; and obtaining to-be-merged information in the target sample field by taking the field mapping information as reference information; mapping, based on node parameters of a plurality of mapping path nodes corresponding to the sample label mapping path, the to-be-merged information to a sample field in which the field feature information is located to obtain a data merging list corresponding to the to-be-merged information in the sample field in which the field feature information is located; splitting the final sample data and the retained sample data based on the data merging list; and pairing and merging, one by one based on a data merging order in the data merging list, a first data set obtained by splitting the final sample data and a second data set obtained by splitting the retained sample data.

18. A data processing apparatus, comprising:

a model training module, configured to obtain first sample data corresponding to a first business project from a preset database, train N candidate models based on the first sample data, select M target models from the N candidate models based on a maximal mutual-information coefficient, and determine M feature sets corresponding to the M target models, wherein N and M are positive integers, and N is greater than M;

a data division module, configured to obtain second sample data corresponding to a second business project from the preset database, and divide the second sample data into a development data set and a validation data set based on a predetermined proportion or a predetermined chronological order;

a label determining module, configured to train the M target models based on the development data set and a data feature corresponding to the development data set to determine a hit probability of target sample data of the development data set, a hit probability of target sample data of the validation data set and a hit probability of target sample data of the first sample data, and determine a hit label of the target sample data of the first sample data based on the hit probability of the target sample data of the development data set, the hit probability of the target sample data of the validation data set, the hit probability of the target sample data of the first sample data, and a preset probability threshold;

a score calculation module, configured to calculate area under curve (AUC) scores of the M target models based on the hit probability of the target sample data of the validation data set output by the M target models, and actual sample labels;

a data selection module, configured to select, based on the hit label of the first sample data, identical target sample data output by the M target models to be initially selected sample data; and determine weighted average probabilities of the initially selected sample data based on the hit probability of the target sample data of the first sample data of the M target models and the AUC scores of the M target models;

a data extraction module, configured to sort the weighted average probabilities to obtain a sorted queue, and extract sample data from two ends of the sorted queue to be final sample data based on the predetermined proportion;

a data determining module, configured to determine retained sample data of the development data set based on the hit probability of the target sample data of the development data set and the AUC scores of the M target models; and a data merging module, configured to merge the final sample data and the retained sample data to obtain a modeling data set corresponding to the first business project.

19. The data processing apparatus according to claim 18, wherein the model training module is configured to:

after obtaining a first feature distribution queue and a second feature distribution queue of each target model, obtain first queue description information of the first feature distribution queue and second queue description information of the second feature distribution queue, wherein the first feature distribution queue comprises a first feature distribution trajectory, and the second feature distribution queue comprises a second feature distribution trajectory; and obtain information variables in the first queue description information and information variables in the second queue description information to obtain an information variable matrix; determine a variable correlation coefficient between any two groups of information variables in the information variable matrix to obtain a first correlation coefficient list; adjust a variable correlation coefficient being less than a target coefficient in the first correlation coefficient list to be the target coefficient to obtain a second correlation coefficient list; and determine a feature set corresponding to each target model based on the second correlation coefficient list and a coincidence degree between the first feature distribution trajectory and the second feature distribution trajectory.

20. The data processing apparatus according to claim 18, wherein the data merging module is configured to:

construct a first data label distribution corresponding to the final sample data, and a second data label distribution corresponding to the retained sample data, wherein the first data label distribution and the second data label distribution comprise a plurality of sample fields with different label recognition degrees, respectively;

extract field feature information of any sample field of the final sample data in the first data label distribution, and determine a sample field with a minimum label recognition degree in the second data label distribution as a target sample field;

map the field feature information to the target sample field based on a temporal correlation between the final sample data and the retained sample data to obtain field mapping information in the target sample field, and generate a sample label mapping path between the final sample data and the retained sample data based on the field feature information and the field mapping information; and obtain to-be-merged information in the target sample field by taking the field mapping information as reference information; map, based on node parameters of a plurality of mapping path nodes corresponding to the sample label mapping path, the to-be-merged information to a sample field in which the field feature information is located to obtain a data merging list corresponding to the to-be-merged information in the sample field in which the field feature information is located; split the final sample data and the retained sample data based on the data merging list; and pair and merge, one by one based on a data merging order in the data merging list, a first data set obtained by splitting the final sample data and a second data set obtained by splitting the retained sample data.

* * * * *